Figure 1:
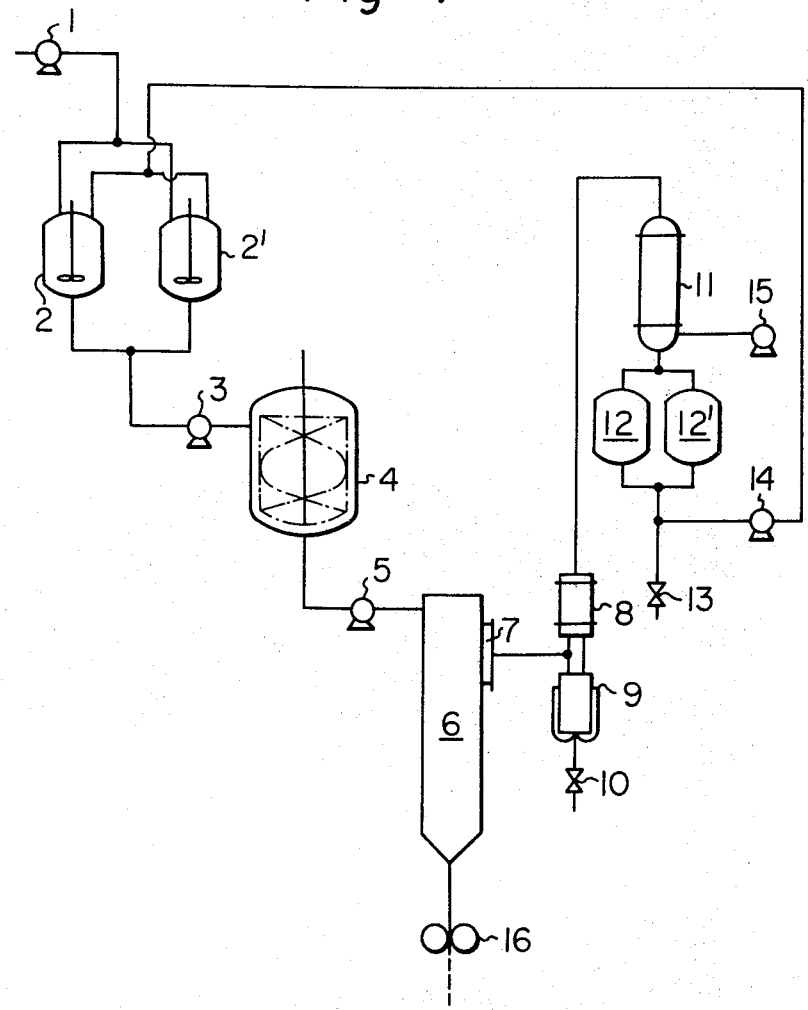

United States Patent [19]

Shimada et al.

[11] 3,968,059

[45] July 6, 1976

[54] PROCESS FOR PRODUCING METHYL METHACRYLATE POLYMERS

[75] Inventors: Kazushi Shimada; Toru Maeda; Tamotu Nishizawa, all of Otake; Yositaka Sasaki, Tokyo; Takehiko Narisada; Hisao Anzai, both of Otake, all of Japan

[73] Assignee: Mitsubishi Rayon Co., Ltd., Tokyo, Japan

[22] Filed: Feb. 4, 1975

[21] Appl. No.: 546,883

[30] Foreign Application Priority Data
Feb. 4, 1974  Japan............................ 49-14262

[52] U.S. Cl.......................... 526/68; 260/89.5 A; 260/89.5 S
[51] Int. Cl.².................. C08F 2/02; C08F 6/28; C08F 20/14; C08F 20/18
[58] Field of Search................. 260/89.5 A, 89.5 S, 260/86.1 E

[56] References Cited
UNITED STATES PATENTS

| | | |
|---|---|---|
| 2,714,101 | 7/1955 | Amos et al.................... 260/89.5 A |
| 3,234,303 | 2/1966 | Bild et al. ...................... 260/89.5 A |
| 3,637,545 | 1/1972 | Fivel .............................. 260/89.5 A |
| 3,806,556 | 4/1974 | Paleologo et al. ............. 260/89.5 A |
| 3,821,330 | 6/1974 | Free................................ 260/89.5 A |
| 3,900,453 | 8/1975 | Shimada et al. ............... 260/89.5 A |

*Primary Examiner*—Alan Holler
*Attorney, Agent, or Firm*—Armstrong, Nikaido & Wegner

[57] ABSTRACT

A process of producing methyl methacrylate polymers is provided wherein the monomer are polymerized by a bulk polymerization procedure at 150° to 180°C with a conversion of 50 to 80% and the volatiles predominantly comprised of the unreacted monomer, separated from the polymer product, are cyclically reused as a part of the monomer feed for polymerization. In such a monomer feed cycle system, oligomers are substantially removed from the volatiles and then the volatiles are blended with a virgin monomer feed for polymerization, the content in the volatiles of impurities having boiling points of lower than 200°C at normal pressure is maintained within the range of 5 to 20% by weight.

11 Claims, 1 Drawing Figure

PROCESS FOR PRODUCING METHYL METHACRYLATE POLYMERS

This invention relates to the production of methyl methacrylate polymers. More particularly, it relates to a process for producing methyl methacrylate polymers by a bulk polymerization procedure which includes the so-called monomer feed-cycling step wherein volatiles predominantly comprised of an unreacted monomer or monomers, separated from the polymer product, are cyclically reused as a part of the monomer feed for polymerization.

A bulk polymerization procedure for the production of methyl methacrylate polymers is advantageous in that there is no need of waste water treatment and the polymerization can be performed advantageously in a continuous manner. However, a bulk polymerization procedure is less practical than a suspension polymerization procedure because, in the former process, the reaction velocity tends to increase sharply and uncontrollably and the viscosity of the polymerization mixture tends to increase abruptly, with an increase of the conversion, which phenomenon is well known in the art as the "gel effect". The gel effect makes it difficult to remove the heat of polymerization rapidly accumulated in the polymerization mixture and also to transfer the polymerization mixture to the subsequent step. In order to prevent or mitigate the influence brought by the gel effect in the bulk polymerization of methyl methacrylate, it becomes necessary that the polymerization is carried out with a reduced conversion. However, the reduction of the conversion produces a problem, i.e. it becomes costly to separate and recover the increased amount of volatiles predominantly comprised of an unreacted monomer or monomers.

Thus, of utmost importance in the bulk polymerization of methyl methacrylate is how efficiently the volatiles, which are predominantly comprised of an unreacted monomer or monomers and separated from the polymer product, are reused as a monomer feed for polymerization. If all of the volatiles predominantly comprised of an unreacted monomer or monomers, separated from the polymer product, are cycled, as they are, i.e. without refinement, as a part of a monomer feed to a further polymerization step, the accumulation of impurities contained in the volatiles increases as the number of repetitions of the cycle increases. Obviously this has a bad influence on the polymer. The "impurities" contained in the volatiles refer to polymers having relatively low molecular weights, i.e. so-called oligomers, of methyl methacrylate and a comonomer employed and to impurities having lower boiling points than those of the oligomers.

If the volatiles predominantly comprised of an unreacted monomer or monomers are completely refined, i.e. the impurities present therein are completely removed therefrom, and then used as a part of the monomer feed for polymerization, the undesirable accumulation of the impurities can be avoided. However, such a procedure is not advantageous for the following reasons. First, when the volatiles are refined by distillation, the unreacted monomer contained in the volatiles is liable to be polymerized in the distillation column and consequently deposited on the inner wall of the distillation column. This makes it difficult to continue the distillation with a high and uniform efficiency. Second, it is difficult or very costly to selectively remove only the impurities and make the other ingredients such as a chain transfer agent remain.

It is an object of the present invention to provide a process for producing methyl methacrylate polymers by a bulk polymerization procedure wherein the volatiles predominantly comprised of an unreacted monomer or monomers, separated from the polymer product, are cyclically used as a part of the monomer feed, which process can be performed with improved reliability and stability and is advantageous for cost considerations.

Another object of the present invention is to provide methyl methacrylate polymers which possess performances similar to those of the polymers prepared only from a virgin monomer feed, that is, are not inferior to the latter polymers in thermal stability, thermal distortion temperature, color and other performances.

Other objects and advantages of the present invention will be apparent from the following description.

In accordance with the present invention, there is provided an improvement in the process of producing a methyl methacrylate polymer or a copolymer comprising at least 80% by weight of units derived from methyl methacrylate and at most 20% by weight of units derived from a copolymerizable ethylenically unsaturated compound by a bulk polymerization procedure wherein the monomer or monomers are polymerized at temperatures of 150° to 180°C with a conversion of 50 to 80% by weight in a polymerization zone and the polymerization mixture withdrawn from the polymerization zone is introduced into a separation zone where volatiles predominantly comprised of an unreacted monomer or monomers are separated from the polymer product, said separated volatiles being cyclically used as a part of the monomer feed for the polymerization, said improvement being characterized in that polymers having molecular weights of 186 to approximately 1,000 are substantially removed from the volatiles predominantly comprised of the unreacted monomer or monomers, and the volatiles so treated are used cyclically as a part of the monomer feed for the polymerization while the content in the volatiles of impurities having boiling points of lower than 200°C at normal pressure is maintained within the range from 5 to 20% by weight based on the weight of the volatiles.

The content of impurities possessing boiling points of lower than 200°C at normal pressure can be maintained within the range from 5 to 20% by weight based on the weight of the volatiles in the following manner. That is, when only a fresh monomer feed is used as the starting material for polymerization, the volatiles separated from the polymer product contain extremely minor amounts of the impurities. However, when the polymerization is repeated or continued while the volatiles separated from the polymer product are cyclically used as a part of the monomer feed, i.e. while the volatiles separated are blended with a fresh monomer feed and the blend is used as the monomer feed for the following polymerization step, the content of the impurities in the volatiles separated from the polymer product increases by degrees with repetition or continuation of the polymerization. When the content of the impurities in the volatiles gets near the intended value falling within the range from 5 to 20% by weight, a portion of the volatiles is removed from the cycle system and only the remaining portion is used cyclically as a part of the monomer feed for the following polymerization step. The term "fresh monomer feed" used herein refers to a so-called virgin monomer feed which is used as the starting material for the first polymerization and prepared by blending methyl methacrylate and an optional comonomer with a polymerization initiator, a chain transfer agent and other optional additives. In general, the fresh monomer feed contains impurities having boiling points of lower than 200°C at normal pressure although only in trace amounts.

The volatiles separated from the polymer product at the separation zone comprise, besides predominant amounts of unreacted methyl methacrylate and optional comonomer, minor amounts of oligomers, i.e. polymers having relatively low molecular weights, usually 186 to approximately 1,000, and minor amounts of other impurities having boiling points of lower than approximately 200°C at normal pressure. The oligomers are produced by side reactions inevitably taking place during the polymerization.

It has been found that, if the polymerization of methyl methacrylate is continued or repeated while the volatiles separated from the polymer product are cyclically used as they are, i.e. without refinement, as a part of the monomer feed for polymerization, the resulting polymer becomes poor by degrees in some physical properties such as thermal distortion temperature and color, with repetition or continuation of the polymerization. The undesirable reduction of the thermal distortion temperature and color formation are caused by low molecular weight polymers, usually having molecular weights of 186 to approximately 1,000, which are present in the polymer product. Such low molecular weight polymers are hereinafter referred to as "oligomers" for brevity. The oligomers are present in the polymer product because the volatiles are not completely separated from the polymer product in the separation step.

Among the oligomers, dimers greatly influence the thermal distortion temperature. It is presumed that dimers function as plasticizer for the polymer. The dimers herein referred to are those which are formed from methyl methacrylate alone or from methyl methacrylate and another copolymerizable ethylenically unsaturated compound. The dimers include, for example, a headhead methyl methacrylate dimer (molecular weight = 200) represented by the formula:

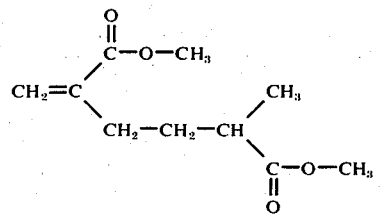

and a methyl methacrylate-methyl acrylate dimer which is formed in the copolymerization of methyl methacrylate and methyl acrylate and represented by the formula:

-continued

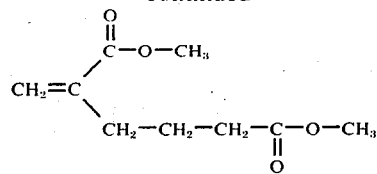

The amount of dimers formed in the polymerization step varies depending upon the concentration of monomer in the polymerization mixture, the polymerization temperature and the residence time.

It is preferable that increase in the amount of dimers in the polymer product, during repetition or continuation of the polymerization, is less than 0.2% by weight for the desired heat distortion temperature. In the monomer feed cycle system of the present invention, if the content of dimers in the volatiles to be blended with a fresh monomer feed is less than approximately 2% by weight, the increase in the content of dimers in the polymer product, during repetition or continuation of the polymerization can be less than 0.2% by weight. Accordingly, oligomers should preferably be removed from the volatiles in a manner such that the content of dimers in the volatiles is reduced to less than approximately 2% by weight.

Among the oligomers, those which possess relatively high molecular weights, i.e. from approximately 500 to approximately 1,000, have been proved by light absorption analysis to greatly influence the color formation in the polymer product. It is more difficult to remove such oligmers of relatively high molecular weight in the volatile separation step, than to remove the dimers as set forth above and, therefore, oligomers should preferably be removed from the volatles in a manner such that the content of such relatively high molecular weight oligomers in the volatiles is reduced to an extremely low level, usually less than 0.01% by weight.

The oligomers may be removed from the volatiles by placing the volatiles under conditions such that a substantial part of the monomer or monomers are not condensed but the oligomers are condensed. Such conditions may suitably be selected from temperatures of 30° to 150°C and reduced pressures of 5 to 500 mmHg. The removal of oligomers from the volatiles may be performed by not only conventional distillation procedures, but also simpler procedures utilizing partial condensation, such as disclosed in Japanese Patent Publication 15889/1960. One preferable procedure for the removal of oligomers is as follows. The volatiles separated from the polymerization mixture are introduced between coupled upper and lower heat exchangers. A part of the volatiles is condensed at the upper heat exchanger and flows down to the lower heat exchanger where said part is heated to temperatures such that said part is partially vaporized but a substantial part of the oligomers is not vaporized. Thus, oligomers in the form of liquid are withdrawn from the bottom of the lower heat exchanger and the volatiles substantially consisting of monomer or monomers in the form of vapor are withdrawn from the top of the upper heat exchanger. This procedure is advantageous in that the separation of the monomer from oligomers can be almost completely effected and, if a minor amount of polymer is present in the volatiles, the polymer is completely withdrawn together with oligomers from the heat exchangers and is not deposited on the inner wall of the heat exchangers.

The volatiles contain impurites, other than oligomers, which have boiling points lower than approximately 200°C at normal pressure. Such impurities originate in the fresh monomer feed. That is, methyl methacrylate and other copolymerizable ethylenically unsaturated compounds contain such impurities although in a trace amount. Most of the impurities are by-products in the production of methyl methacrylate and other monomers, and remain in the methyl methacrylate and other monomers because it is difficult to completely remove these impurities by distillation due to the fact that they have boiling points close to those of methyl methacrylate and other monomers or they produce azeotropic mixtures.

The impurities and the amounts thereof in methyl methacrylate vary depending upon the procedure for synthesizing methyl methacrylate. Impurities contained in methyl methacrylate include, for example, methyl isobutyrate (B.P. 93°C), water (B.P. 100°C), ethyl methacrylate (B.P. 118°C), methyl α-hydroxyisobutyrate (B.P. 137°C), methyl β-methoxyisobutyrate (B.P. 147°C) and methacrylic acid (B.P. 161°C). Of these, methyl isobutyrate, methyl α-hydroxyisobutyrate and water are serious because these impurities are present in larger amounts. Ethyl methacrylate and methacrylic acid are not serious because they are copolymerizable with methyl methacrylate and do not accumulate in the volatiles. Similarly, monomers other than methyl methacrylate contain impurities of low boiling points, although not illustrated herein.

If the impurities having boiling points lower than approximately 200°C at normal pressure accumulate in the polymerization mixture, they badly influence the polymerization, for example, they are liable to lower the rate of polymerization, the yield of polymer and the molecular weight of polymer, and injure the thermal stability of polymer. Thus, the content of such impurities in the volatiles should be less than 20% by weight, preferably less than 15% by weight.

It has been found surprisingly that the presence of the impurities in a minor amount, i.e. approximately 5% by weight or more, is advantageous in that it becomes easy to maintain a constant polymer content in the polymerization product. The minor amount of the impurities reduces the dependency of the polymer content in the polymerization product upon the residence time. This advantage is marked particularly in the continuous polymerization employing a completely stirred reactor.

The content of the impurities, set forth above, in the volatiles may be maintained at between 5 to 20% by weight by removing a portion of the volatiles from the cycle system and only the remaining portion is cyclically used as a part of the momomer feed when the content gets near the intended value falling within the range from 5 to 20% by weight with repetition or continuation of the polymerization, as illustrated hereinbefore. Even though a portion of the volatiles is removed from the cycle system and disposed, the cycle system of the present invention is advantageous for cost considerations because the amount of the volatiles disposed in very small. For example, when a continuous polymerization is carried out with a conversion of 60%, while the contents of the impurities of low boiling points in the volatiles and in the fresh monomer feed are maintained at 5% by weight and 0.1% by weight, respectively, the amount of the volatiles to be disposed is only 2% by weight based on the weight of the polymer. If the content of the impurities in the volatiles is maintained at a higher level, the amount of the volatiles to be disposed can be greatly reduced.

Methyl methacrylate polymers produced by the process of the invention may be either a homopolymer of methyl methacrylate or a copolymer containing at least 80% by weight of units derived from methyl methacrylate and at most 20% by weight of units derived from a copolymerizable ethylenically unsaturated compound. The copolymerizable ethylenically unsaturated compounds include for example alkyl acrylate having 1 to 18 carbon atoms in the alkyl group and alkyl methacrylate having 2 to 18 carbon atoms in the alkyl group. Of these, methyl acrylate, ethyl acrylate and butyl acrylate are preferable. These ethylenically unsaturated compounds may be used either alone or in combination.

The monomer feed cycle system of the invention is advantageously employed in a bulk polymerization procedure wherein the monomer or monomers are polymerized at relatively high temperatures, i.e. from 150°C to 180°C, preferably from 150°C to 160°C, with a conversion of 50 to 80% in a polymerization zone and the volatiles predominantly comprised of an unreacted monomer or monomers are separated from the polymer product at temperatures of 200 to 290°C and pressures of 5 to 500 mmHg in a separation zone. Preferably polymerization procedures and volatile separation procedures are described in detail in the copending U.S. Patent Applications Ser. No. 388,554 now U.S. Pat. Nos. 3,900,453 and 495,273 The bulk polymerization may be carried out either in a continuous manner with continuous cycle of the recovered volatiles or in a batchwise manner while the recovered volatiles are stored in a reservoir and intermittently withdrawn therefrom for the cycle, although the former manner is preferable.

One preferred embodiment of the process of the present invention will be illustrated with reference to the accompanying drawing (FIG. 1), which is a flow sheet showing the polymerization process and the volatile cycle process.

In the drawing, a fresh monomer or monomers, a polymerization initiator and a chain transfer agent are introduced by a pump 1 into a monomer feed preparation vessel 2 or 2'. Volatiles predominantly comprised of an unreacted monomer or monomers are introduced by a pump 14 into the preparation vessel 2 or 2'. A monomer feed prepared therein is fed by a metering pump 3 to a polymerization reactor 4 where the monomer feed is maintained at 150° – 180°C to be polymerized with a conversion of 50 – 80%.

The polymerization reactor employed is preferably of a vessel type equipped with a suitable stirrer for completely mixing the polymerization mixture. Incidentally, a polymerization reactor of a so-called "plug flow type" wherein a monomer feed is introduced thereinto at one end and advances slowly toward the other end from which a polymerized mass is withdrawn, and wherein a reacting liquid is mixed in directions perpendicular to the axis of the reactor, but not in a direction parallel to the axis of the vessel is not preferable for use in the practice of the invention. Instead of a single polymerization reactor, two or more polymerization reactors disposed either in series or in parallel may be used.

The polymerization mixture comprising approximately 50 to 80% by weight of polymer withdrawn from the polymerization reactor is fed by a pump 5 to a devolatilizer extruder 6 where the polymerization mixture is separated at a reduced pressure into the polymer product and the volatiles. The polymer product is extruded from the devolatilzer extruder and pelletized by a pelletizer 16. The volatiles are withdrawn from the vent 7 of the devolatilizer extruder and introduced between upper and lower heat exchangers 8 and 9. Oligomers are withdrawn from the bottom of the lower heat exchanger 9 through a valve 10. The type of the upper heat exchanger 8 is not critical but a multitube type is preferable. The lower heat exchanger 9 should be equipped with a reservoir at the lower part thereof for reserving the condensed liquid a part of which is to be evaporated therein. Preferable lower heat exchangers are vessel types equipped with jacket or coil heating means.

The vapor of the volatiles withdrawn from the top of the upper heat exchanger 8 are liquefied in a total condensor 11 and reserved in holders 12 and 12'. The liquid volatiles are cyclically introduced to the monomer feed preparation vessel 2 or 2' by a pump 14. The content of impurities having low boiling points in the volatiles is maintained within 5 to 20% by weight by removing a portion of the recovered liquid volatiles through a valve 13 from the cycle system. The removal of the portion of the volatiles may be carried out either before or after the removal of the oligomers and either intermittently or continuously. The inside of the upper and lower heat exchangers 8 and 9, the total condenser 11 and the holders 12 and 12' are maintained at a reduced pressure approximately similar to that at the inside of the vent portion 7 of the devolatilizer extruder 6, by a vacuum pump 15.

Instead of the single vent type devolatilzer extruder shown in the drawing, a multi-vent type devolatilizer extruder which possesses two or more vent portions may be employed. Two or more cycle lines each comprising upper and lower heat exchangers, a total condenser and at least one holder may be arranged in parallel for the multi-vent type devolatilizer extruder.

The invention will be further specifically described by the following illustrative but not limitative examples in which all percentages and parts are by weight unless otherwise specified.

The intrinsic viscosity [$\eta$] which is a standard for evaluting the polymerization degree of polymer was determined by measuring at 25°C the flow time of a 0.5% polymer solution in chloroform and of chloroform in an Ostwald viscometer and calculating it as follows.

$$\text{Intrinsic viscosity } [\eta] = \frac{3 \left[ (t/t_0)^{1/3} - 1 \right]}{C}$$

where:
$t$ = efflux time of the polymer solution,
$t_0$ = efflux time of chloroform, and
$C$ = concentration in g/l of the polymer in the solution.

The flow rate of polymer was determined in accordance with ASTM-D1238-65T where the barrel temperature was set at 230°C and the weight loaded to the piston was 3.8 kg in Examples 1 to 5 and 10 kg in Examples 6 to 9, respectively; and was expressed in grams per 10 minutes.

The resistance to thermal degradation of polymer was estimated as follows. A given polymer product was injection molded under the following conditions wherein the barrel temperature was varied.

Injection molding machine employed: H-35A, plunger type, supplied by Meiki Seisakusho, Japan

| Mold volume: | 110 mm × 110 mm × 2 mm |
|---|---|
| Injection pressure: | 1,200 kg/cm²G |
| Mold filling time: | 4 sec/stroke |
| Cycle: | 65 seconds. |

The resistance to thermal degradation was expressed in terms of the maximum barrel temperature at which frequency of a molded article possessing visible defects such as those popularly called as "silver streaks" or "flashes" does not exceed 20%. This maximum barrel temperature is hereinafter referred to as "$T_2$" for brevity.

The degree of coloration of the polymer product was determined as follows. Five sheets each having a 110 mm × 110 mm × 2 mm size, which were injection-molded from a given polymer product at a temperature of $T_2$ under the same conditions as those employed for the determination of the resistance to thermal degradation, were piled up. A white light was transmitted through the piled sheets and the color was compared with color standards placed in a test glass. The color standards were prepared as follows. A standard solution having a color of No. 1 as determined according to Gardner color scale was diluted with distilled water, the ratio of the standard solution to distilled water being 1/9, 2/8, 3/7 . . . . . and 9/1, to obtain color standards having colors of 0.1, 0.2, 0.3 . . . . . and 0.9, respectively.

The heat distortion temperature of polymer was determined in accordance with ASTM D648-56 (Reapproved 1961) wherein the fiber stress was 264 psi and the rate of temperature elevation was 3.6°F per minute. It was referred to as "HDT" for brevity.

EXAMPLES 1 to 5

Continuous bulk copolymerization of methyl methacrylate and methyl acrylate was carried out by employing a polymerization and monomer feed cycle system similar to that shown in FIG. 1 wherein two completely stirred reactors arranged in series, each equipped with a ribbon screw type stirrer were employed as the polymerization reactor and a biaxial screw extruder with a single vent was employed as the devolatilizer extruder.

The recovered volatiles predominantly comprised of the monomers were reserved in a nitrogen atmosphere in a reservoir (not shown in FIG. 1) positioned between the pump 14 and the monomer feed preparation vessels 2 and 2'. At intervals of 8 hours, the reserved volatiles were fed therefrom to either of the monomer feed preparation vessels 2 and 2' where the volatiles were blended with a fresh monomer feed to prepare a 175 kg batch.

Th polymerization conditions and the performances of polymers are shown in Table I, below.

Table I

| Example No. | Monomer feed composition (1st cycle) (parts) | Feed rate (Kg/Hr) | Polymerization conditions | | | | Volatile separation | Removal of oligomers (Pressure 160 mmHg) | |
|---|---|---|---|---|---|---|---|---|---|
| | | | | | 1st | 2nd | | Temperature of upper heat exchanger*¹ (°C) | Temperature of lower heat exchanger*¹ (°C) |
| 1 Control | MMA*² 88 MA*³ 12 t-butylmercaptan 0.3 di-t-butylperoxide 0.0014 | 21–22 | Reactor Temperature Polymer content Residence time | | 150°C 45% 3.6Hr | 170°C 65% 6.0Hr | Barrel temperature 250°C Vent portion pressure 160 mmHg | 150 | 150 |
| 2 Control | " | " | " | | " | " | " | 150 | 150 |
| 3 Invention | " | " | " | | " | " | " | 65 | 90 |
| 4 Control | " | " | " | | " | " | " | 90 | 90 |
| 5 Control | " | " | " | | " | " | " | — | — |

Note:
*¹Temperature of the heat transfer medium entering into the heat exchanger.
*²MMA = Methyl Methacrylate
*³MA = Methyl acrylate

| Example No. | Manner in which volatiles were cyclically used | Operation period (days) | Impurities in volatiles | | | Performances of polymer | | | | |
|---|---|---|---|---|---|---|---|---|---|---|
| | | | Dimers (%) | Oligomers (M.W.=500–1,000) (%) | Impurities (B.P.= below 200°C) (%) | Color scale | $[\eta]$ | Flow rate | $T_2$ (°C) | HOT (°C) |
| 1 Control | Volatiles were cyclically used without removal of oligomers. | 5 | 24 | 0.02 | 1.9 | 0.2–0.25 | 0.055 | 9.3 | 285 | 82.4 |
| 2 Control | Volatiles were cyclically used, but no portion of volatiles was removed from cycle system. | 5 | 22 | Below 0.01 | 1.9 | 0.1–0.15 | 0.055 | 9.3 | 285 | 82.4 |
| 3 Invention | Volatiles were cyclically used while a portion of volatiles was removed from cycle system at a rate of 150 g/Hr. | 50 | 0.2 | Below 0.01 | 11 | 0.1–0.15 | 0.055 | 8.8 | 285 | 86.6 |
| 4 Control | Volatiles were cyclically used, but no portion of volatiles was removed from cycle system.*⁴ | 50 | 1.4 | Below 0.01 | 25 | 0.1–0.15 | 0.054 | 10.0 | 275 | 80.3 |
| 5 Control | No volatiles were cyclically used (Only fresh feed was used). | — | — | — | — | 0.1–0.15 | 0.056 | 8.5 | 285 | 87.5 |

Note:
*⁴After the operation of Example 3, the operation was continued in a manner similar to that in Example 2 for 50 days.

EXAMPLES 6 to 9

Continuous bulk polymerization of methyl methacrylate was carried out by empolying a polymerization and monomer feed cycle system similar to that shown in FIG. 1 wherein a completely stirred reactor equipped with a ribbon screw type stirrer and a single screw extruder with double vents were employed as the polymerization reactor and the devolatilizer extruder, respectively. The amount of a catalyst (di-t-butylperoxide) employed in each of the Examples was set such that the residence time in the polymerization zone was 4 hours and the polymer content in the polymerization mixture was 60% by weight. The amount of a chain transfer agent (t-butylmercaptan) employed in each of the Examples was set such that the intrinsic viscosity $[\eta]$ of polymer was approximately 0.054.

Table II

| Example No. | | 6 (Control)*⁵ | 7 (Invention) | 8 (Invention) | 9 (Control) |
|---|---|---|---|---|---|
| Amount of impurities (B.P. = below 200°C) in volatile (%) | | — | 5 | 12.5 | 25 |
| Monomer feed composition (parts) | | | | | |
| MMA | | 100 | 98 | 95 | 90 |
| t-butylmercaptan | | 0.31 | 0.31 | 0.30 | 0.27 |
| di-t-butylperoxide | | 0.0017 | 0.0019 | 0.0022 | 0.0030 |
| Impurities (B.P. = below 200°C) | | 0.1 | 2.0 | 5.0 | 10.0 |
| Dimers | | 0 | 0.2 | 0.2 | 0.2 |
| Polymerization temperature (°C) | | 155 | | | |
| Polymer content (%) | at residence time of 4 Hr | 60 | 60 | 60 | 60 |
| | 4 Hr and 6 min. | *6 | 62 | 61 | 61 |
| Volatile separation | 1st vent portion | 160 mmHg 250°C | | | |
| | 2nd vent portion | 60 mmHg 270°C | | | |
| Performances of polymer | Color scale | 0.1 – 0.15 | 0.1 – 0.15 | 0.1 – 0.15 | 0.1 – 0.15 |
| | $[\eta]$ | 0.054 | 0.054 | 0.054 | 0.053 |
| | Flow rate | 7.5 | 7.5 | 7.5 | 8.5 |
| | $T_2$ (°C) | 295 | 295 | 295 | 280 |

Table II-continued

| Example No. | 6 (Control)*⁵ | 7 (Invention) | 8 (Invention) | 9 (Control) |
|---|---|---|---|---|
| HDT (°C) | 101.7 | 101.0 | 101.0 | 98.6 |

Note:
*⁵No volatiles were cyclically used, i.e. only fresh monomer feed was used.
*⁶The viscosity of the polymerization mixture uncontrollably increased and it was impossible to continue the polymerization operation.

What we claim is:

1. An improvement in the process of producing a methyl methacrylate polymer or a copolymer, said methyl methacrylate polymer or copolymer comprising at least 80% by weight of units derived from methyl methacrylate and at most 20% by weight of units derived from a copolymerizable ethylenically unsaturated compound, by a bulk polymerization procedure wherein the monomer or monomers are polymerized at temperatures of 150° to 180°C with a conversion of 50 to 80% in a polymerization zone and the polymerizaton mixture withdrawn from the polymerizaton zone is introduced into a separation zone where volatiles predominantly comprised of an unreacted monomer or monomers are separated from the polymer product, said separated volatiles being cyclically used as a part of the monomer feed for the polymerization, said improvement comprising substantially removing polymers having molecular weights of 186 to approximately 1,000 from the volatiles and cyclically using the volatiles so treated as a part of the monomer feed for the polymerization while maintaining the content in the volatiles of impurities having boiling points of lower than 200°C at normal pressure within the range from 5 to 20% by weight based on the weight of the volatiles.

2. The process according to claim 1 wherein said maintenance of the content of the impurities in the volatiles is carried out by removing a portion of the separated volatiles, either before or after the substantial removal of the polymers having molecular weight of 186 to approximately 1,000, when the content of the impurities in the volatiles gets near the intended value falling within the range from 5 to 20% by weight with repetition or continuation of the polymerization, and cyclically feeding the remaining portion of the volatiles as a part of the monomer feed to the polymerization zone.

3. The process according to claim 1 wherein the content of said impurities in the volatiles is maintained within the range from 5 to 15% by weight based on the weight of the volatiles.

4. The process according to claim 1 wherein said impurities having boiling points of lower than 200°C comprise methyl isobutyrate, methyl α-hydroxyisobutyrate and water.

5. The process according to claim 1 wherein said volatiles predominantly comprised of the unreacted monomer or monomers are maintained at temperatures of 30° to 150°C and pressures of 5 to 500 mmHg whereby said polymers having molecular weights of 186 to approximately 1,000 are substantially removed.

6. The process according to claim 1 wherein said substantial removal of the polymers having molecular weights of 186 to approximately 1,000 is effected to an extent such that the resulting volatiles contain less than 2% by weight of dimers formed from methyl methacrylate alone or from methyl methacrylate and the copolymerizable ethylenically unsaturated compound.

7. The process according to claim 1 wherein said substantial removal of the polymers having molecular weights of 186 to approximately 1,000 is effected to an extent such that the resulting volatiles contain less than 0.01% by weight of the polymer ingredients having molecular weights of approximately 500 to approximately 1,000.

8. The process according to claim 1 wherein said polymerization is carried out in a continuous manner by employing at least one reactor equipped with a stirring means for completely stirring the polymerization mixture.

9. The process according to claim 1 wherein said polymerization mixture is heated at 200°C to 290°C under a reduced pressure of 5 to 500 mmHg in the separation zone whereby said volatiles are separated from the polymer product.

10. The process according to claim 1 wherein said polymerization is carried out at temperatures of 150° to 160°C.

11. The process according to claim 1 wherein said copolymerizable ethylenically unsaturated compound is selected from methyl acrylate, ethyl acrylate and butyl acrylate.

* * * * *